US012232235B2

United States Patent
(12) United States Patent
MacDonald

(10) Patent No.: US 12,232,235 B2
(45) Date of Patent: Feb. 18, 2025

(54) PILLOW SPEAKER RELAY CIRCUIT, PILLOW SPEAKER, AND METHOD FOR SAME

(71) Applicant: Curbell Medical Products, Inc., Orchard Park, NY (US)

(72) Inventor: Daniel J. MacDonald, East Amherst, NY (US)

(73) Assignee: Curbell Medical Products, Inc., Orchard Park, NY (US)

( * ) Notice: Subject to any disclaimer, the term of this patent is extended or adjusted under 35 U.S.C. 154(b) by 798 days.

(21) Appl. No.: 17/233,414

(22) Filed: Apr. 16, 2021

(65) Prior Publication Data

US 2022/0338326 A1 Oct. 20, 2022

(51) Int. Cl.

| | |
|---|---|
| ***H05B 47/12*** | (2020.01) |
| ***A47G 9/10*** | (2006.01) |
| ***E06B 9/68*** | (2006.01) |
| ***H04R 1/02*** | (2006.01) |
| ***H04R 1/04*** | (2006.01) |

(52) U.S. Cl.

CPC .......... *H05B 47/12* (2020.01); *A47G 9/1045* (2013.01); *H04R 1/028* (2013.01); *H04R 1/04* (2013.01); *E06B 9/68* (2013.01)

(58) Field of Classification Search

CPC ...... H05B 47/12; A47G 9/1045; H04R 1/028; H04R 1/04; H04R 5/023; E06B 9/68

See application file for complete search history.

(56) References Cited

U.S. PATENT DOCUMENTS

| | | | | |
|---|---|---|---|---|
| 7,948,420 B1 * | 5/2011 | Brahma | H03M 1/0629 455/141 |
| 2008/0048784 A1 * | 2/2008 | Shih | H03F 3/45928 330/298 |
| 2008/0204956 A1 * | 8/2008 | Hung | H05B 39/08 361/91.1 |
| 2013/0342950 A1 * | 12/2013 | Westrick, Jr. | H01H 47/22 361/170 |
| 2015/0099464 A1 * | 4/2015 | Kiat | H01H 71/00 455/41.1 |

(Continued)

FOREIGN PATENT DOCUMENTS

WO WO-2019128662 A1 * 7/2019 .......... G05B 19/042

OTHER PUBLICATIONS

WIPO Document (Year: 2019).*

*Primary Examiner* — Oyesola C Ojo
(74) *Attorney, Agent, or Firm* — Hodgson Russ LLP

(57) ABSTRACT

The present disclosure provides a method for determining a presence of a relay in a pillow speaker, including sampling a voltage of a relay drive line to detect a first feedback state; providing a control signal to activate the relay drive line; sampling a voltage of the relay drive line during activation to detect a second feedback state; and comparing the first feedback state and the second feedback state to detect a presence of a relay. In another aspect, a pillow speaker relay circuit includes a relay drive line with a relay terminal configured to connect to a relay such that current flows through the relay when the relay drive line is activated; a control circuit operable to activate the relay drive line, and a feedback detection circuit configured to detect a voltage of the relay drive line; and a controller to perform any of the disclosed methods.

15 Claims, 7 Drawing Sheets

(56) References Cited

U.S. PATENT DOCUMENTS

| | | | | |
|---|---|---|---|---|
| 2016/0042901 | A1* | 2/2016 | Oosterwal | H01H 9/56<br>361/186 |
| 2018/0240629 | A1* | 8/2018 | Ao | G01R 31/3278 |
| 2021/0036503 | A1* | 2/2021 | He | H02H 3/05 |
| 2022/0283328 | A1* | 9/2022 | Schafer | G01V 1/186 |
| 2023/0236235 | A1* | 7/2023 | Liu | G01R 25/005<br>324/521 |

* cited by examiner

PILLOW SPEAKER RELAY CIRCUIT, PILLOW SPEAKER, AND METHOD FOR SAME

FIELD OF THE DISCLOSURE

The present disclosure relates to a pillow speaker system capable of controlling room environmental components (room controls) in a hospital or other patient care setting, and more particularly, to the automatic identification of available room controls in a given setting.

BACKGROUND OF THE DISCLOSURE

In healthcare settings, a patient's room often provides a variety of environmental components that may be controlled by a patient to improve comfort, commonly referred to as "room controls." These room controls may include, as examples, main room lighting, task or overhead lighting, bathroom lighting, dimming capability, lighting configured as "scenes," window shade control, ambient temperature adjustment, or any of these configured for smaller regions of a room.

Traditionally room controls are connected to and operated through the nurse call patient station in the room. The patient station may be electrically wired to relays, low-voltage controllers (LVCs), or similar hardware to convert electrical signaling into the control of higher-voltage electrical power and/or conversion of electrical to mechanical energy in a manner compliant with applicable regulations. The physical pillow speaker connected to the patient station provides fixed buttons that may be pressed to communicate with the patient station for operating room controls. The pillow speaker design is customized for each application based on the type of nurse call system in use, the number of room controls available, and the type of room controls. Only one pillow speaker firmware image needs to be developed as the presence or absence of room control buttons on the customized pillow speaker determine the room control functions available to the patient.

BRIEF SUMMARY OF THE DISCLOSURE

In a first aspect, the present disclosure provides a method for determining a presence of a relay in a pillow speaker. The method includes sampling a voltage of a relay drive line to detect a first feedback state. A control signal is provided (e.g., provided on the relay drive line) to activate the relay drive line. For example, the relay drive line is activated by connecting a relay terminal of the relay drive line to ground (e.g., based on the control signal). For example, the relay terminal may be connected to ground using a transistor, such as, for example, an N-channel enhancement mode metal oxide semiconductor field-effect transistor (N-channel MOSFET or NFET). In some embodiments, the relay drive line is activated by connecting a relay terminal of the relay drive line to a voltage source, such as, for example, a voltage source having a voltage sufficient to actuate the relay.

A voltage of the relay drive line is sampled during activation of the relay drive line to detect a second feedback state. For example, the voltage may be sampled by way of a test line. Such a test line may have a Schmitt trigger, a buffer, and/or an inverter. In some embodiments, the control signal is provided for a pre-determined period of time selected to be less than an operate time of a relay. The first feedback state is compared to the second feedback state to detect a presence of a relay if the first feedback state and the second feedback state are different. The method may further include providing a confirmation signal when the first feedback state is different from the second feedback state. For example, the confirmation signal may be provided to a patient interface device.

In another aspect, the present disclosure provides a pillow speaker relay circuit having a relay drive line with a relay terminal configured to connect to a relay such that current flows through the relay when the relay drive line is activated. . The pillow speaker relay circuit includes a control circuit operable to activate the relay drive line, and a feedback detection circuit configured to detect a voltage of the relay drive line. A controller is provided, and the controller is configured to sample a voltage of the relay drive line to detect a first feedback state; provide a control signal to the control circuit to activate the relay drive line; and sample a voltage of the relay drive line during activation to detect a second feedback state.

In another aspect, a pillow speaker includes a plurality of the pillow speaker relay circuits described above. The pillow speaker may also include a plurality of logic gates arranged in a cascade. The feedback detection circuit of each pillow speaker relay circuit may be connected to an input of the logic gate cascade to provide a single feedback test point. In some embodiments, the pillow speaker includes a base station (HUB) and a patient interaction device (PID) in electronic communication with the HUB. The plurality of speaker relay circuits and the plurality of logic gates may be housed within the HUB.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
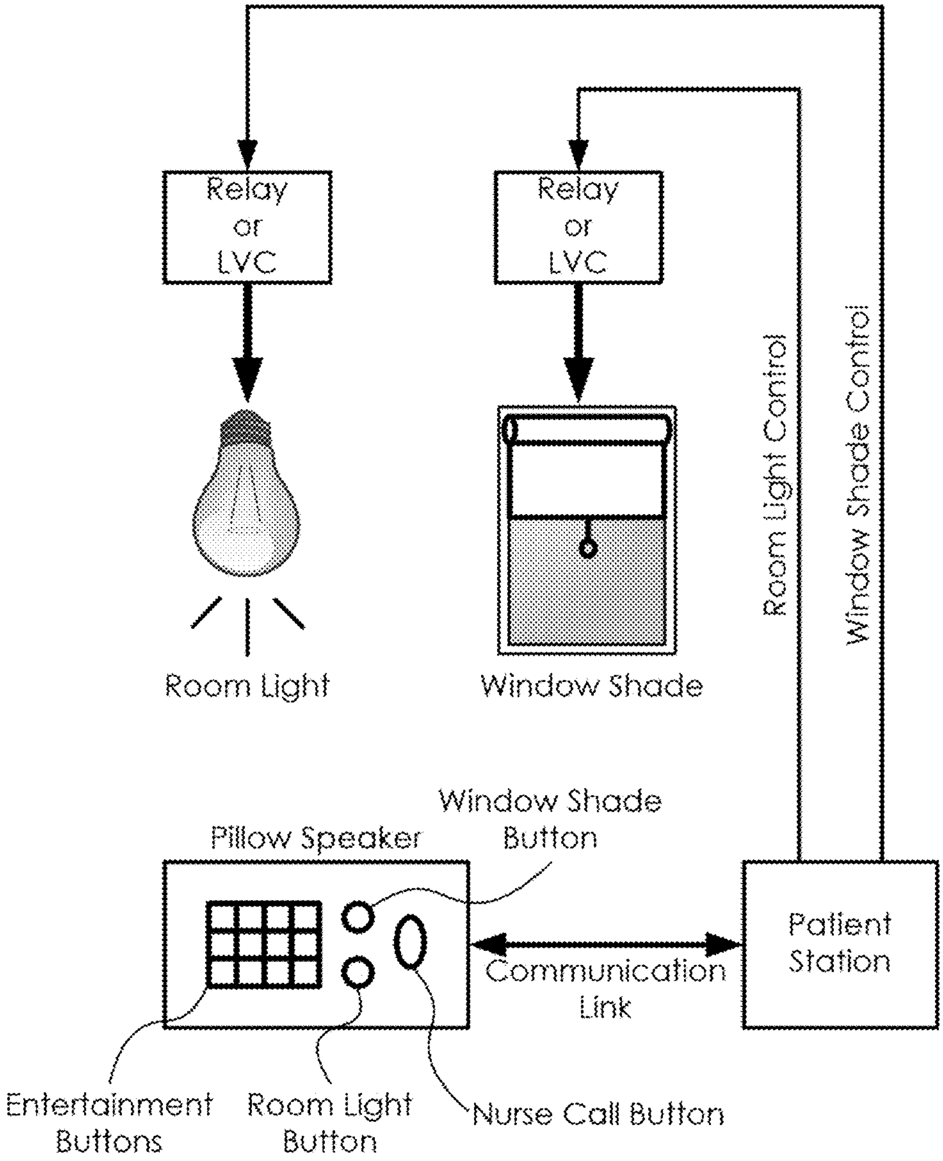
FIG. 1 is an illustration depicting a prior art pillow speaker control of a room environment.
Figure 2:
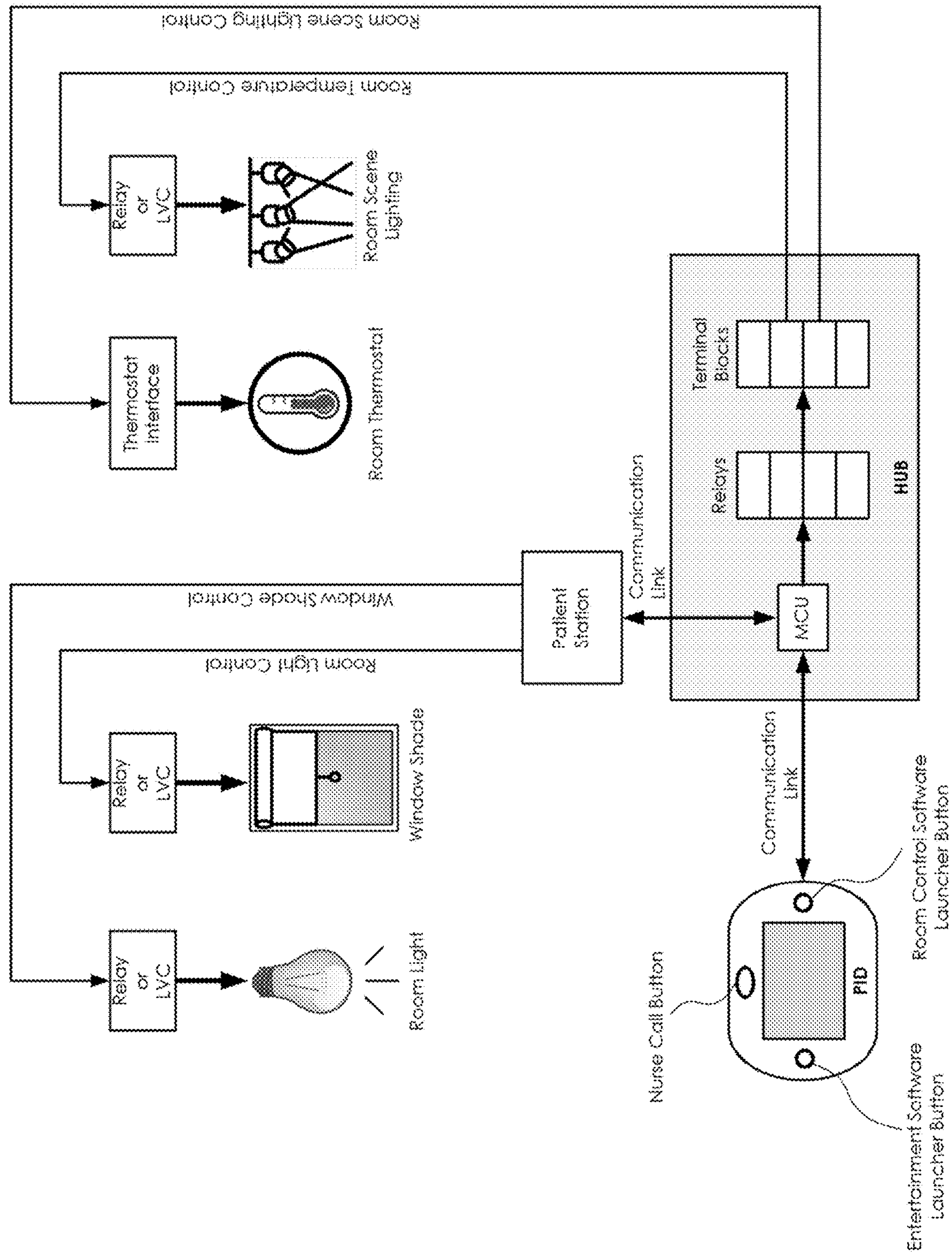
FIG. 2 is an illustration depicting a prior art advanced pillow speaker control of a room environment.

The present disclosure may be embodied as a pillow speaker system with relay detection. Embodiments of the presently-disclosed relay detection may be used to detect the presence of one or more relays (for example, during installation or reconfiguration) and/or to test installed relays, or other functions. In some embodiments, the pillow speaker system is an advanced system having a base station (HUB) in communication with a patient interaction device (PID). In such an embodiment, the HUB may be configurable with one or more relays to control room equipment such as, for example, lighting, temperature control, entertainment, etc. (referred to herein as "room controls"). The HUB may also be in communication with a nurse call patient station, which may also be configured to control one or more room controls.

Communication between all systems may be analog, digital, or a combination of analog and digital. Communication between all systems may be wired and/or wireless. The HUB may comprise a plurality of printed circuit board assemblies and electrical circuitry that implement advanced pillow speaker system functionality and is compatible with different nurse call systems. The HUB may comprise a plurality of microcontroller units (MCU) in communication with the PID and nurse call patient station. The HUB MCU may also be in communication with room controls, which are additional room controls provided above and beyond existing room controls available through the nurse call patient station.

The HUB may have one or more microcontroller units (MCUs). Further description is provided with reference to a single HUB MCU for convenience, and embodiments are not limited to only one MCU. The HUB MCU may be programmed to receive a command from the PID and subsequently control a plurality of signal and/or power relays to which each room control is electrically connected. Each relay may provide galvanic isolation between HUB MCU and each corresponding room control, because the HUB MCU may be powered from a low-voltage domain and the room control(s) may require a high-voltage interface. The galvanic isolation may also break undesirable ground loops between the HUB MCU and room control(s). The galvanic isolation may provide an additional measure of safety between the HUB system components and the external room controls. A relay may implement any switch configuration as required by the room control; for example, it may implement a single-pole single-throw (SPST) circuit. Combinations of relays and/or switch configurations in a relay may be wired together into new configurations to provide additional room control functionality. The relay may implement momentary or latching behavior. The relay circuit implemented on the HUB PCB may also provide electrical configurations ("makes" or "jumps" and "breaks" or "opens") such that the relay is normally open (NO) or normally closed (NC). In some embodiments, an interface between wired room controls and a relay may be provided through a terminal block installed within the HUB, for example, on a printed circuit board of the HUB.

The HUB MCU may control a relay after receiving a command from the PID by activating a relay drive line. For example, the MCU may switch a general-purpose input/output (GPIO) pin of the MCU from a low voltage (logic-0) to a high voltage (logic-1) or vice versa.

This signal may, in turn, drive support circuitry to activate the relay by allowing current to flow through a coil of the relay via the relay drive line and at the rated voltage of the coil. When the HUB MCU stops driving the signal at the GPIO pin, the current will no longer flow through the coil and the relay is deactivated.

Pillow speakers, for example, pillow speakers with HUBs, may be configurable to interface with one or more room controls. When installed in a room, a pillow speaker may be populated with only those relays necessary for the number of room controls present in the room. For example, a pillow speaker may be configurable to control up to four room controls, but the room in which the pillow speaker is installed only has one room control. In this case, the pillow speaker may be populated with only one relay, and the remaining three relay positions may not be populated.

In some embodiments, the present disclosure is a general method to provide feedback to the HUB MCU for determining a presence of a relay when the HUB MCU attempts to control the relay. In some embodiments, the method may be used to check for installed (populated) relays, the presence of which indicates a particular room control is available. In some embodiments, the method may be used as a diagnostic check of a relay (i.e., self-check of a coil of a relay).

In an embodiment, a method 100 for determining a presence of a relay includes sampling 103 a voltage of a relay drive line to detect a first feedback state. As further described below and depicted in FIG. 5, the relay drive line may be configured to, for example, connect a coil of a relay to ground or disconnect the coil from ground, such that when connected to ground, a sufficient voltage (e.g., a rated coil voltage, etc.) is applied across the coil so as to actuate the relay. A control signal is provided 106 so as to activate the relay drive line. For example, in some embodiments, the relay drive line is activated by connecting a relay terminal of the relay drive line to ground. In this case, the control signal is provided to cause the relay terminal to connect to ground. In a particular example, this may be accomplished by switching a transistor, such as an n-channel enhancement mode metal oxide semiconductor field-effect transistor ("MOSFET"), to connect the relay terminal to ground. It should be noted that the term ground is intended to be interpreted broadly and may refer to a ground reference, a common voltage low of a circuit, a current sink, etc. and does not necessarily require reference to earth ground. In this way, a control signal may be provided by, for example, a MCU (e.g., at a GPIO pin) to cause a transistor to connect a relay terminal to ground. As mentioned above, a HUB may have a relay populated by connection to a relay terminal. In the exemplary embodiment above, the relay may be connected such that a coil of the relay is connected between the relay terminal and a current source. In the populated case (when a relay is present), activation of the relay drive line (i.e., by a control signal) will complete a circuit between the current source and ground, thereby allowing current to flow through the relay of the coil. The method includes sampling 109 a voltage of the relay drive line during activation of the relay drive line to detect a second feedback state. The first feedback state is compared 112 to the second feedback state to determine a presence of a relay. When a relay is present, and current flows during activation of the relay drive line, the second feedback state will be different from the first feedback state. For example, the relay delay line voltage may be sampled using a current sense circuit (e.g., a current sense resistor) to determine the first feedback state and the second feedback state.

On the other hand, when not populated by a relay, activation of the relay drive line will not complete a circuit between the voltage source and ground because of the open circuit at the unpopulated relay terminal, and no current will flow. In this case, the second feedback state will be the same as the first feedback state.

In some embodiments, the method 100 includes providing 115 a confirmation signal when the first feedback state is different from the second feedback state. For example, the confirmation signal may be provided to a PID when present. In this way, a PID may be used to test and/or configure a relay configuration of a pillow speaker (e.g., a hub of a pillow speaker), determine a presence of a relay, etc.

Figure 3:
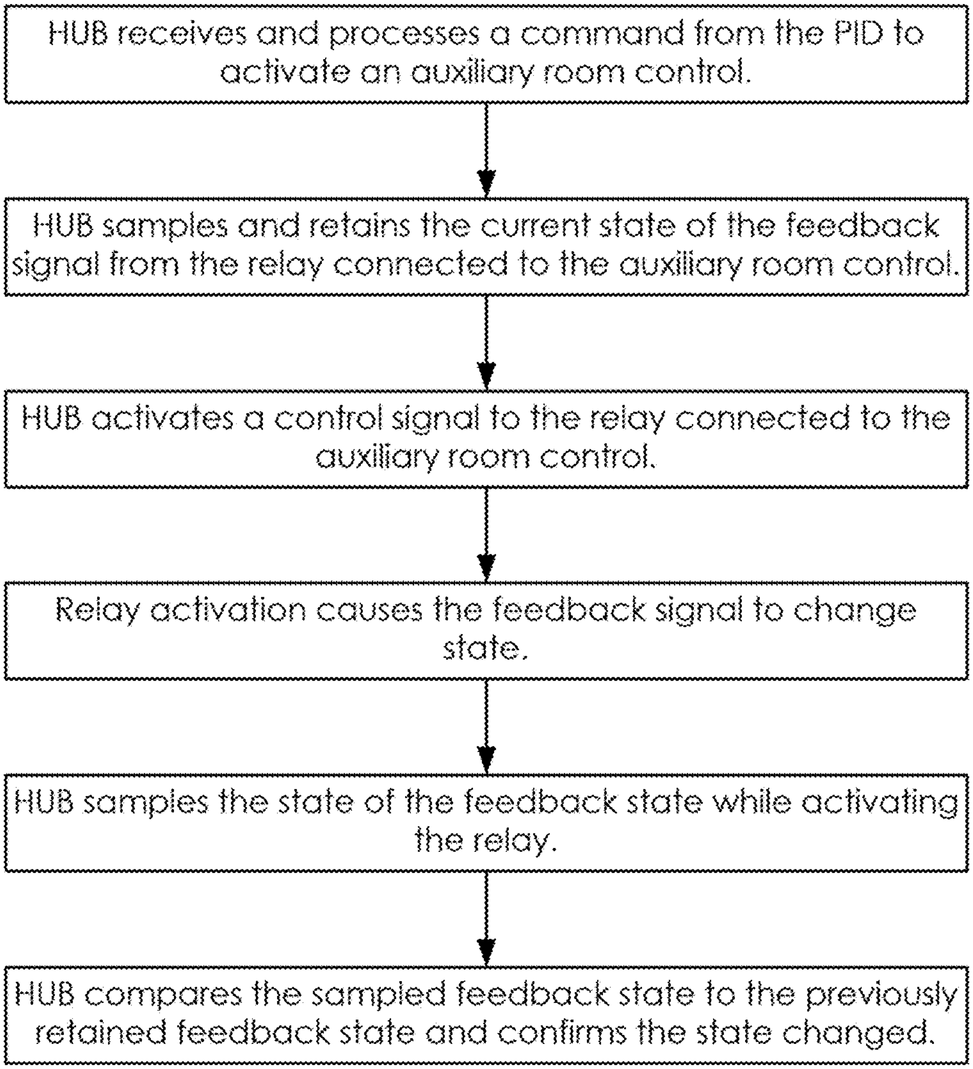
FIG. 3 is a chart showing a method according to an embodiment of the present disclosure.

FIG. 3 illustrates another embodiment of the present method to determine the presence of a relay (e.g., associated with a room control). In an advanced pillow speaker system, the fixed in-room base module (HUB) is in communication with a patient interaction device (PID). One or more relays are electrically wired to room controls may be installed on the HUB printed circuit board (PCB). The HUB first receives a message from the PID to activate a room control (for example, this may occur when a patient presses a soft button on a touchscreen with a room control icon provided by a software application running on the PID). The HUB will sample and retain the current state of a feedback signal (a first feedback state) linked to the condition of the relay drive line. There may be a plurality of feedback signals, each one linked to an individual relay, or, more desirably, there may be a single feedback signal whose state will change based on the condition of a plurality of relays. The feedback signal may be digital and may be derived from combinational and/or sequential logic, or it may be an analog signal that is, for example, sampled by an analog-to-digital converter (ADC), including implemented as a comparator.

The HUB MCU activates a control signal to the relay drive line corresponding to the desired room control. If the relay is installed (populated) on the PCB and is functional, current will flow through the relay and the relay drive line, and the feedback signal will change state. For example, this may be a digital state change from a low voltage (logic-0) to a "high" voltage (logic-1) (in the case of digital logic, "high" voltage is provided in the context of the microcontroller operating voltage (e.g., 5 VDC, 3.3 VDC, etc.)) If the relay is not installed, then the feedback signal will not change state. The HUB will then sample the feedback signal (voltage of the relay control line) a second time and compare this second feedback state to the first feedback state retained after the first sample. The HUB can then compare the states and determine that the relay is populated and the room control is available if the state has changed. This status may be reported back to the PID as acknowledgement to the original command.

It is known that mechanical relays will have an activation time (also referred to as an "operate time," a "pull-in time," or a "pick-up time") required from the initial application of power to the coil, until closure of normally-open contacts and/or opening of normally-closed contacts. In some embodiments, the relay drive line may be activated for a period of time which is long enough to detect a change in status of the relay drive line (e.g., detect a change in voltage), but shorter than the operate time of the relay so as not to cause the relay to operate the room control. That is, the time to activate the relay drive line and the time to sample a feedback state should not exceed the time for the relay's mechanical actuator to engage (the operate time). This prevents room controls from activating, for example, lights switching on and off, while the HUB is querying the populated relays.

Figure 4:
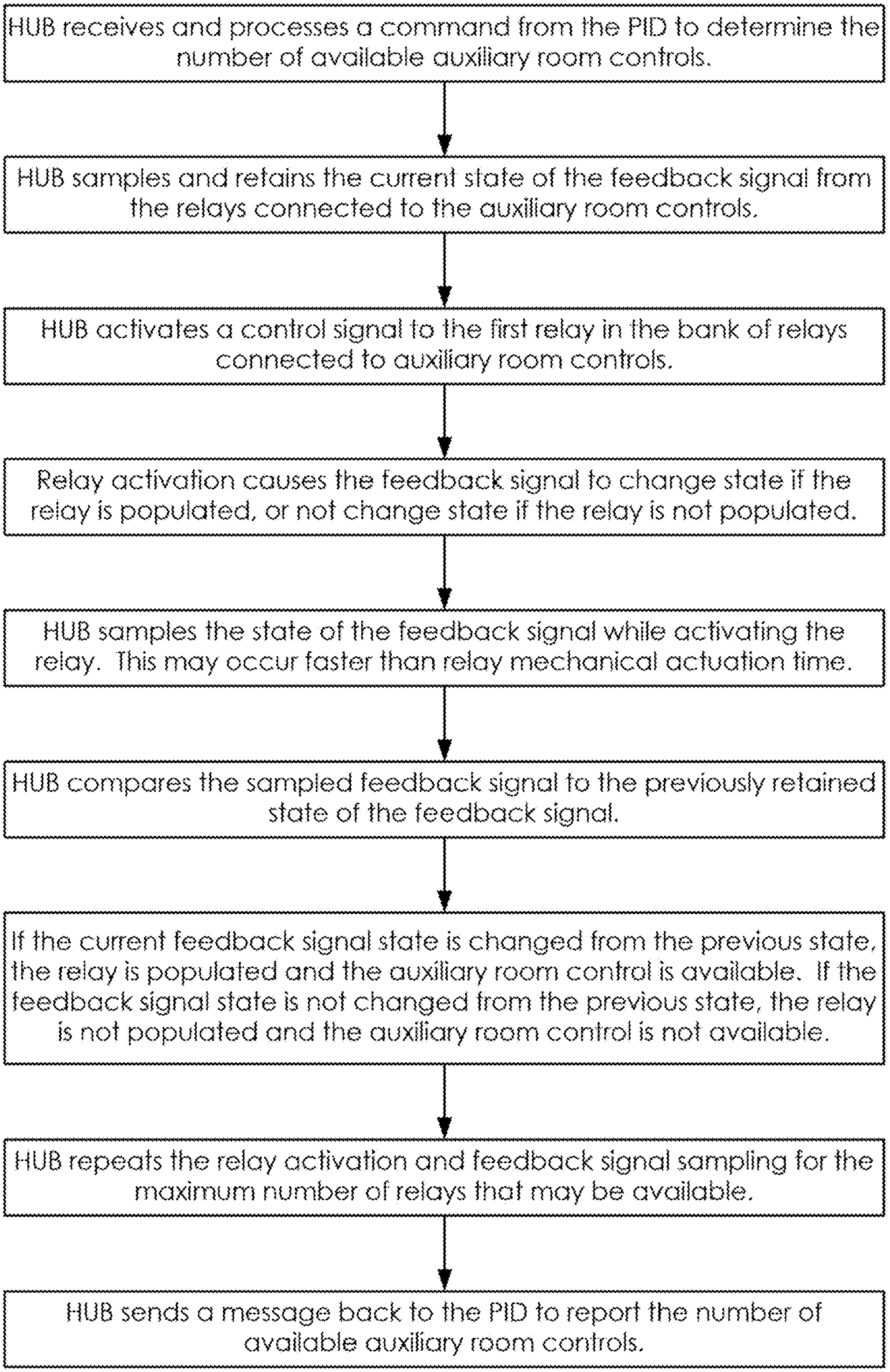
FIG. 4 is a chart showing a method for identifying a number of room controls according to another embodiment of the present disclosure.

FIG. 4 shows an embodiment of a method to apply the general method of FIG. 3 to automatically identify the number of available room controls. In the method, a HUB receives and processes a command from a PID to report the number of available room controls. The HUB will then sample and retain the current state of the feedback signal from the relays electrically connected to room controls. There may be a plurality of feedback signals, one per relay, that may be sampled sequentially or in parallel. Perhaps more desirably, there may be a single feedback signal that changes state as each relay is activated sequentially.

Next, the HUB activates the first relay in the bank of relays connected to room controls. If the relay is installed (populated) and functional, indicating the corresponding room control is available, then the state of the feedback signal will change. If the relay is not installed or not functional, indicating the corresponding room control is not available, then the state of the feedback signal will not change. While the HUB is actively controlling the relay, the HUB will sample the feedback signal a second time. By comparing the second sample to the first sample, the HUB can detect if the state of the feedback signal has changed and therefore determine the relay is installed and functional and the room control is available. The HUB may then repeat this process for each relay up to the maximum possible number of installed relays, storing the result of each test, and finally report the overall result back to the PID.

Thus, a message from the PID can trigger a HUB test procedure outlined in FIG. 4 to automatically identify and report back the number of available room controls to the PID so that the PID may present only the available room control to the patient using the device.

It may be desirable to perform the automatic identification procedure of FIG. 4 quickly enough such that it does not exceed the relay's mechanical activation time (i.e., operate time). That is, the time to drive the relay coil circuit and the time to generate the feedback signal should not exceed the time for the relay's mechanical actuator to engage. This prevents room controls from activating, for example, lights switching on and off, while the HUB is querying the populated relays.

Figure 5:
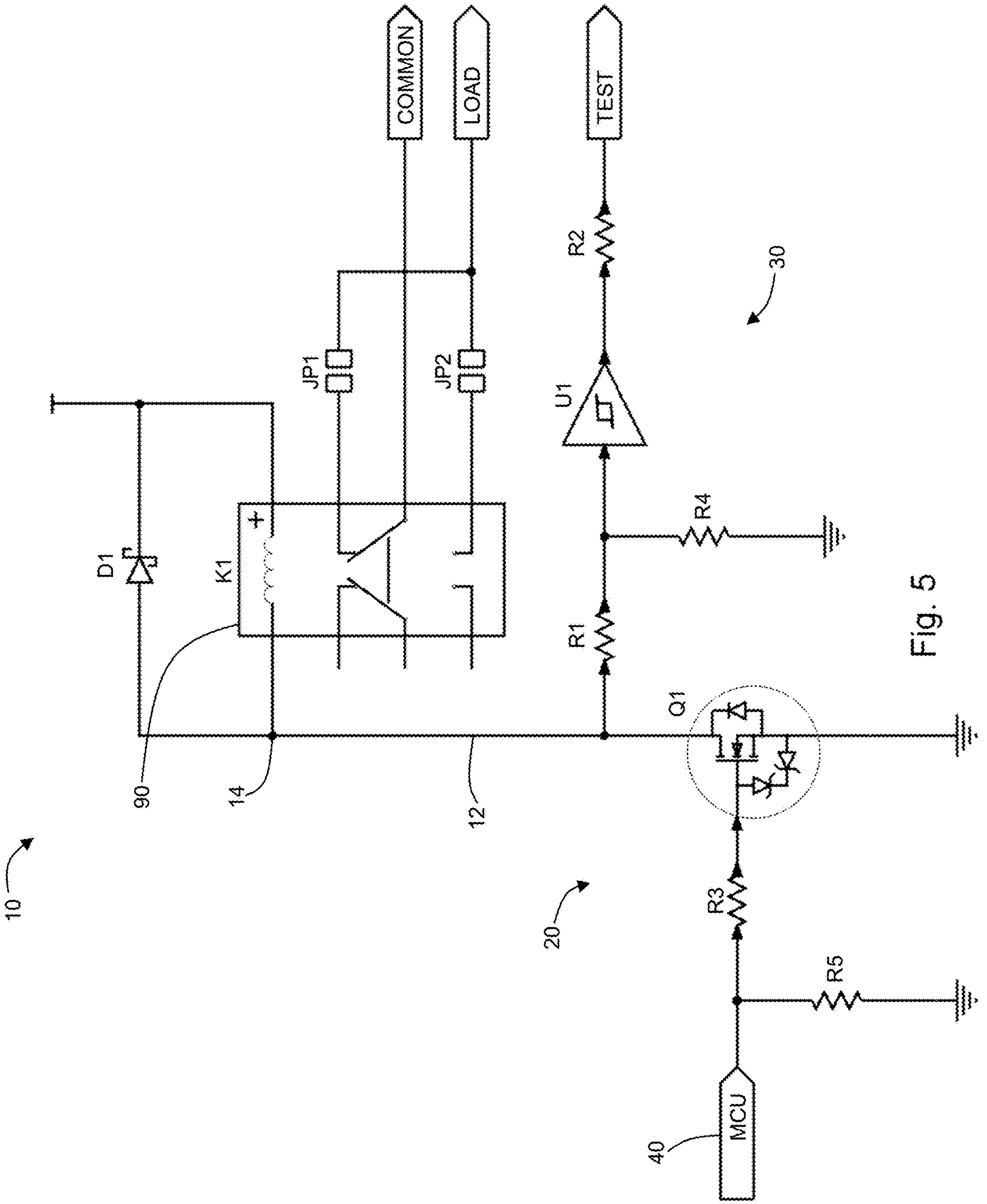
FIG. 5 is a schematic showing a pillow speaker relay circuit according to an embodiment of the present disclosure.

FIG. 5 illustrates another embodiment of the disclosure—a pillow speaker relay circuit 10. This embodiment may have an individual relay circuit with feedback. For example, the pillow speaker relay circuit 10 may have a relay drive line 12 having a relay terminal 14. The relay terminal 14 is configured to connect to a relay 90 such that current flows through the relay when the relay drive line 12 is activated. It should be noted that embodiments of the present disclosure do not include a relay, but are configured to connect to a relay. Other embodiments may include a relay. Others may include more than one relay terminal (see, e.g., FIG. 6). Embodiments having more than one relay terminal may include an equivalent number of relays, fewer relays than relay terminals, or no relays (i.e., configured to connect to relays).

The circuit 10 includes a control circuit 20 operable to activate the relay drive line (as further described below). A feedback detection circuit 30 is configured to detect a voltage of the relay line 12.

The circuit 10 includes a controller 40 (shown as output pin labeled MCU). The controller 40 is configured to sample a voltage of the relay drive line to detect a first feedback state; provide a control signal to the control circuit to activate the relay drive line; and sample a voltage of the relay drive line during activation to detect a second feedback state. Exemplary operations is described below.

Operation is as follows: The HUB MCU firmware configures a general-purpose input/output (GPIO) pin as a push-pull CMOS output driven from 0 V (logic-0) to 3.3 V (logic-1). This signal is input on the port "MCU." Resistor R5 is a pull-down resistor to tie the gate of N-channel enhancement-mode metal oxide semiconductor field-effect transistor (NFET) Q1 low and keep Q1 off if the HUB MCU is not driving the GPIO pin (such as when the MCU is first powered-up or is reset and the application firmware is not running yet). Resistor R3 dampens potential LC resonance between the wire inductance and gate capacitance to reduce the likelihood of electromagnetic interference (EMI).

In the normal, idle state, the MCU does not activate the relay by driving the MCU port to logic-0. This keeps NFET Q1 off so it is in a high impedance state. R4 is a large pull-down resistor, such as 68 kSΩ, and R1 is a smaller fraction of R4 but still relatively large, such as 15 kΩ, such that the series combination of R1 and R4 is very large, on the order of 100 kΩ (in this case 83 kΩ). Thus the coil in relay K1, which is connected to +5 VDC and is essentially a DC short circuit (zero ohms), takes near-zero voltage drop so 5 V appears at R1 and the drain of Q1 relative to ground. This 5 V is interpreted as logic-1 by the 5-volt tolerant Schmitt trigger non-inverting buffer U1, and U1 drives logic-1 at port "TEST" through resistor R2 (a small series termination resistor to reduce EMI). Port "TEST" may loop back as an input GPIO to the MCU as the feedback signal for the relay state.

When the HUB MCU is instructed to activate the relay, it will drive its GPIO to logic-1 (3.3 V) on port "MCU." This turns on NFET Q1 such that Q1 provides a low-resistance conductive path to ground. This pulls current through the relay coil such that the relay activates its mechanical actuator. In the configuration shown, relay K1 is wired to use only one of two channels, where "making" (shorting) jumper JP1 provides a normally-closed connection between ports "LOAD" and "COMMON," and "making" (shorting) jumper JP2 provides a normally-open connection between ports "LOAD" and "COMMON" (the jumpers are mutually exclusive). The room control interface is electrically wired to ports "LOAD" and "COMMON."

As described, when the relay is activated by driving port "MCU" to logic-1, NFET Q1 conducts such that its drain voltage relative to ground is near zero. This means buffer U1, which is a Schmitt trigger noninverting buffer to tolerate slow rising or falling voltage signals at its input, interprets the drain voltage through R1 as logic-0, and thus outputs logic-0 on port "TEST" to the MCU as the feedback signal.

When the MCU no longer activates the relay, the cycle completes such that port "MCU" is at logic-0, NFET Q1 is off and not conducting, the drain on Q1 rises to 5 V, then buffer U1 sees 5 V as logic-1 and drives port "TEST" to logic-1 as feedback to the MCU. Schmitt trigger diode D1 is a flyback diode to clamp the voltage from the relay coil's back electromotive force (EMF) when NFET Q1 turns off and suddenly there is no path for current flow through the coil (which impedes a change in current flow). The voltage divider formed by R1 and R4 further help to protect the 5-volt-tolerant input to U1.

Thus, it is clear an input signal transition on port "MCU" from logic-0 to logic-1 back to logic-0, with the relay state changing from inactive to active to inactive again, causes an output feedback signal on port "TEST" to change from logic-1 to logic-0 to logic-1 respectively.

Consider the case where relay K1 is not installed (populated). There will be no path to +5 VDC as the relay coil no longer exists. The drain of Q1 will always be at zero volts due to pull-down resistor R4 and no corresponding pull-up source. Thus, buffer U1A will always see its input at logic-0 and will always output logic-0 on port "TEST" as the feedback signal to the MCU. When the MCU tries to activate the relay by driving port "MCU" to logic-1, NFET Q1 will turn on but its drain voltage will remain at ground as before. Thus, no state change can be detected at port "TEST"—for input transitions on port "MCU" from logic-0 to logic-1 to logic-0, the feedback signal output on port "TEST" will stay constant at logic-0, logic-0, and logic-0 respectively. The MCU can detect that the feedback signal did not change when activating the relay because the relay is not populated so the room control is not available.

Figure 6:
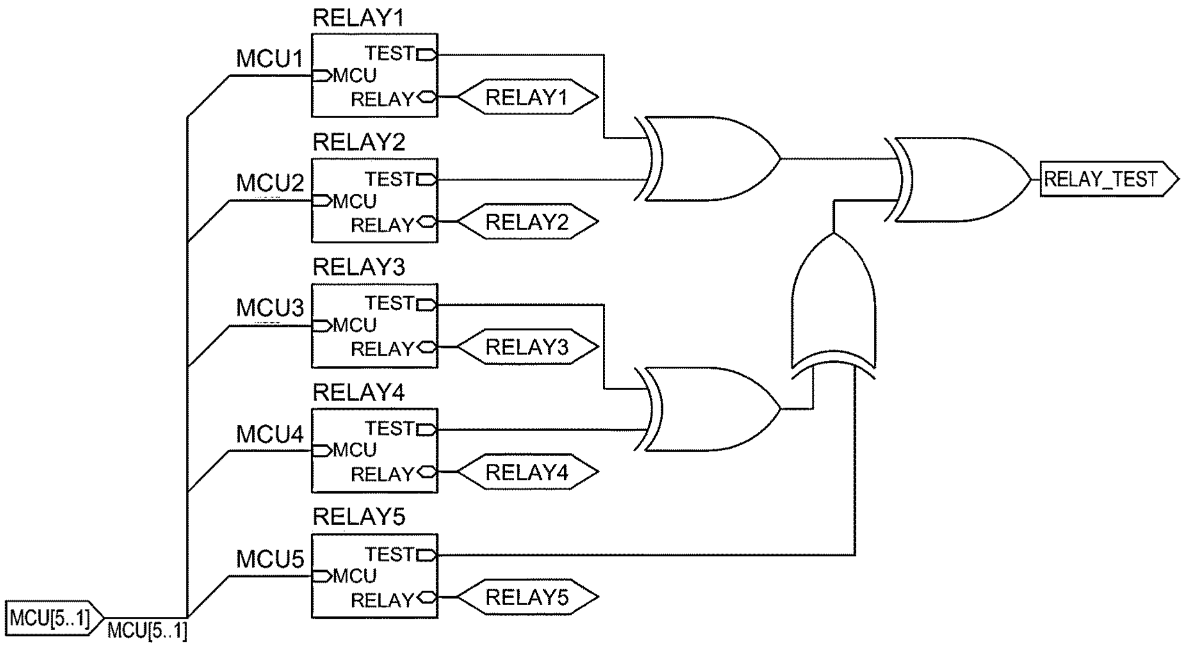
FIG. 6 is a logic diagram of a pillow speaker system according to another embodiment of the present disclosure.
Figure 7:
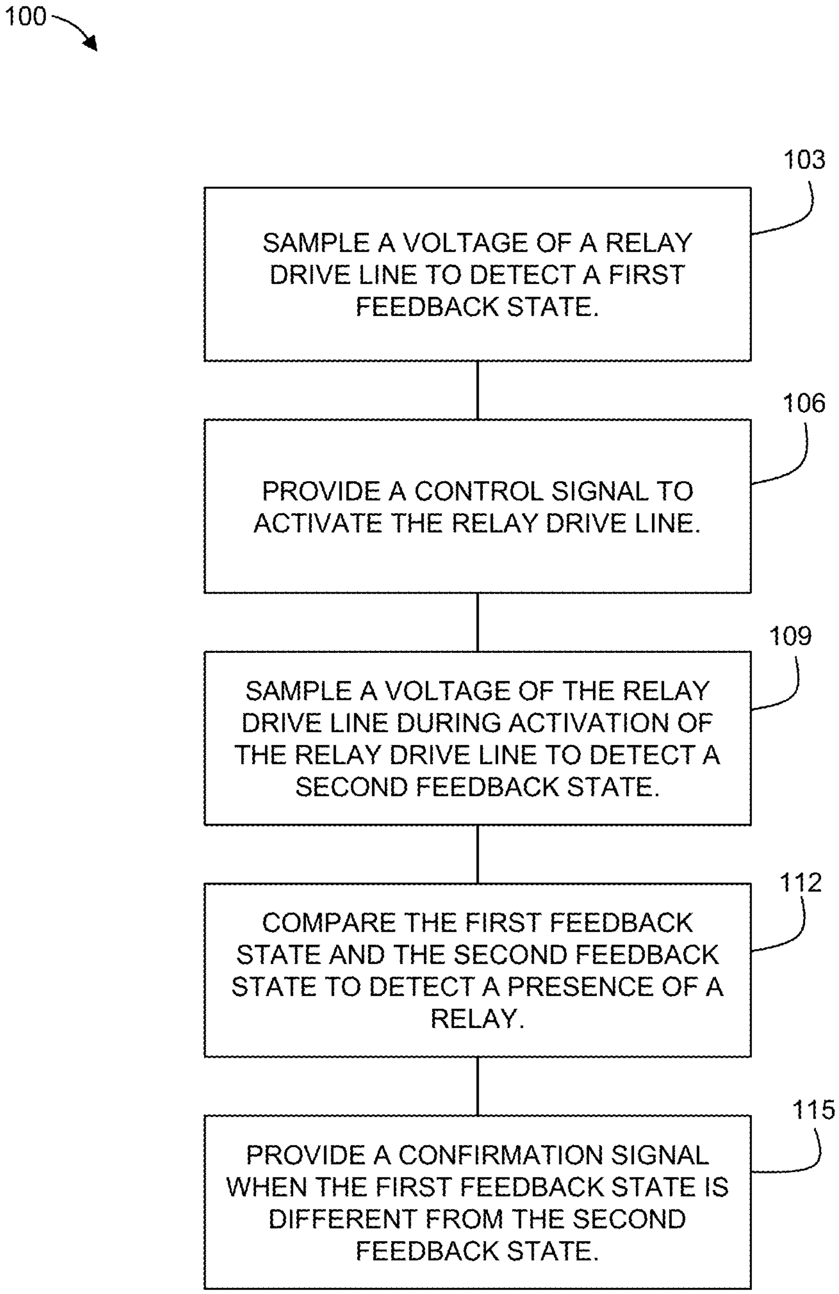
FIG. 7 is a chart showing a method according to another embodiment of the present disclosure.

FIG. 6 illustrates an embodiment of a plurality of relay circuits with a single-bit feedback signal. Each box annotated "RELAYn" (with "n" ranging from 1 to 5) encapsulates the circuit shown in FIG. 5, with the "RELAY" port representing the "COMMON" and "LOAD" ports. Five unique relay circuits are shown, which each relay being individually controlled by the MCU across the 5-bit bus labeled "MCU[5 . . . 1]." through the "MCU" port. Each unique relay circuit outputs a corresponding feedback signal on the port labeled "TEST."

To avoid spending five of the MCU's GPIO pins to read each relay's feedback signals, the feedback signals from all relays may use combinational logic to produce a single-bit feedback signal. This signal should change state each time an individual relay is toggled to maintain the functionality provided by the circuit of FIG. 5. To do this, the circuit of FIG. 6 implements exclusive-OR (XOR) logic gates to combine the plurality of relay feedback signals into a single-bit signal.

The Boolean logic of the two-input XOR gate is defined by the following truth table, where "A" and "B" are inputs, "XOR" is the output, "0" represents logic-0, or false, and "1" represents logic-1, or true:

| A | B | XOR |
|---|---|---|
| 0 | 0 | 0 |
| 0 | 1 | 1 |
| 1 | 0 | 1 |
| 1 | 1 | 0 |

It is apparent that when one input changes logic (but not both on the order of time less than that required for the MCU to process the feedback signal), the output also changes logic. For example, while A is false, changing B from false to true causes the output to change from false to true. Thus, a cascade of XOR gates, as shown in FIG. 6, may be used to combine a plurality of inputs to a single output such that the output changes its logic state each time any one of a plurality of inputs changes its logic state.

It is generally understood that other combinational or sequential logic functions, or combinations of different functions, may be used to produce the output feedback signal (which itself may be a single bit or a plurality of bits). For example, a five-input AND gate, or cascade of two-input AND gates, would produce a logic-1 output when all relays are installed and not activated. Activating any one relay would produce a logic-0 output. However, the AND gate example has the disadvantage that the activation, or possibly even failure, of any one relay would mask the feedback signal from all other relays, since the Boolean logic of the AND gate states that the output is false once one or more inputs are false.

Another possible application of this disclosure is a relay diagnostic system. The circuit operation may be the same as previously described, except that if the number of populated relays, and hence available room controls, is known prior to testing each relay, then activating each relay and checking the feedback signal could verify the absence or presence of a relay matches the expected setup. If there is a mismatch, it may indicate the presence of a relay and therefore room control that has not been made available to the patient, or it may indicate the failure of the relay coil so that the relay should be replaced.

Although the present disclosure has been described with respect to one or more particular embodiments, it will be understood that other embodiments of the present disclosure may be made without departing from the spirit and scope of the present disclosure.

What is claimed is:

1. A method for determining a presence of a relay in a pillow speaker, comprising:

sampling a voltage of a relay drive line to detect a first feedback state;

providing a control signal to activate the relay drive line;

sampling a voltage of the relay drive line during activation of the relay drive line to detect a second feedback state; and comparing the first feedback state and the second feedback state to detect a presence of a relay if the first feedback state and the second feedback state are different.

2. The method of claim 1, wherein the relay drive line is activated by connecting a relay terminal of the relay drive line to ground.

3. The method of claim 2, wherein the relay terminal is connected to ground using a transistor.

4. The method of claim 3, wherein the transistor is an N-channel enhancement mode metal oxide semiconductor field-effect transistor (N-channel MOSFET or NFET).

5. The method of claim 1, wherein the relay drive line is activated by connecting a relay terminal of the relay drive line to a voltage source.

6. The method of claim 5, wherein the voltage source has a voltage sufficient to actuate the relay.

7. The method of claim 1, wherein the voltage is sampled by way of a test line.

8. The method of claim 7, wherein the test line comprises a Schmitt trigger, a buffer, or an inverter.

9. The method of claim 1, further comprising providing a confirmation signal when the first feedback state is different from the second feedback state.

10. The method of claim 9, wherein the confirmation signal is provided to a patient interface device.

11. The method of claim 1, further comprising receiving an input signal from a patient interface device.

12. The method of claim 1, wherein the control signal is provided for a pre-determined period of time selected to be less than an operate time of a relay.

13. A pillow speaker relay circuit, comprising:

a relay drive line having a relay terminal configured to connect to a relay such that current flows through the relay when the relay drive line is activated;

a control circuit operable to activate the relay drive line;

a feedback detection circuit configured to detect a voltage of the relay drive line; and a controller configured to:

sample a voltage of the relay drive line to detect a first feedback state;

provide a control signal to the control circuit to activate the relay drive line; and sample a voltage of the relay drive line during activation to detect a second feedback state.

14. A pillow speaker, comprising:

a plurality of pillow speaker relay circuits according to claim 13;

a plurality of logic gates arranged in a cascade, wherein the feedback detection circuit of each pillow speaker relay circuit is connected to an input of the logic gate cascade to provide a single feedback test point.

15. The pillow speaker of claim 14, further comprising a base station (HUB) and a patient interaction device (PID) in electronic communication with the HUB; and wherein the plurality of pillow speaker relay circuits and the plurality of logic gates are housed within the HUB.

* * * * *